(12) United States Patent
White

(10) Patent No.: US 11,172,652 B2
(45) Date of Patent: Nov. 16, 2021

(54) MULTIPLE DOG ATTACHMENT APPARATUS

(71) Applicant: Vaughn White, Atlanta, GA (US)

(72) Inventor: Vaughn White, Atlanta, GA (US)

( * ) Notice: Subject to any disclaimer, the term of this patent is extended or adjusted under 35 U.S.C. 154(b) by 267 days.

(21) Appl. No.: 16/391,278

(22) Filed: Apr. 22, 2019

(65) Prior Publication Data

US 2019/0343087 A1 Nov. 14, 2019

Related U.S. Application Data

(60) Provisional application No. 62/634,036, filed on Feb. 22, 2018.

(51) Int. Cl.
*A01K 27/00* (2006.01)
*F16B 7/10* (2006.01)

(52) U.S. Cl.
CPC ............ *A01K 27/005* (2013.01); *F16B 7/105* (2013.01)

(58) Field of Classification Search
CPC .... A01K 27/005; A01K 27/00; A01K 27/003; A01K 15/04; F16B 7/105
See application file for complete search history.

(56) References Cited

U.S. PATENT DOCUMENTS

| | | | |
|---|---|---|---|
| 4,186,688 A * | 2/1980 | Gaitan | A01K 15/04 119/712 |
| D337,396 S * | 7/1993 | Werner | D30/153 |
| 5,813,368 A * | 9/1998 | Rasmussen | A01K 27/003 119/799 |
| 6,247,428 B1 * | 6/2001 | Mireles | A01K 27/003 119/771 |
| 7,040,256 B2 * | 5/2006 | Wiggins | A01K 27/003 119/796 |
| 7,726,261 B2 * | 6/2010 | Everhart | A01K 27/005 119/795 |
| 8,151,737 B1 * | 4/2012 | Alonzo | A01K 27/003 119/799 |
| 9,032,911 B2 * | 5/2015 | Hill | A01K 27/003 119/795 |
| 2016/0255818 A1 * | 9/2016 | Brooks | A01K 29/00 |

* cited by examiner

*Primary Examiner* — Kristen C Hayes
(74) *Attorney, Agent, or Firm* — Charlena Thorpe, Esq.; Incorporating Innovation LLC

(57) ABSTRACT

Implementations of a multiple dog attachment apparatus are provided. In some implementations, the multiple dog attachment apparatus comprises a connection apparatus, a first and a second collar connector, and a leash connector.
In some implementations, a method of using the multiple dog attachment apparatus comprises attaching a first dog to the multiple dog attachment apparatus, attaching a second dog to the multiple dog attachment apparatus, and attaching a leash to the multiple dog attachment apparatus.

20 Claims, 6 Drawing Sheets

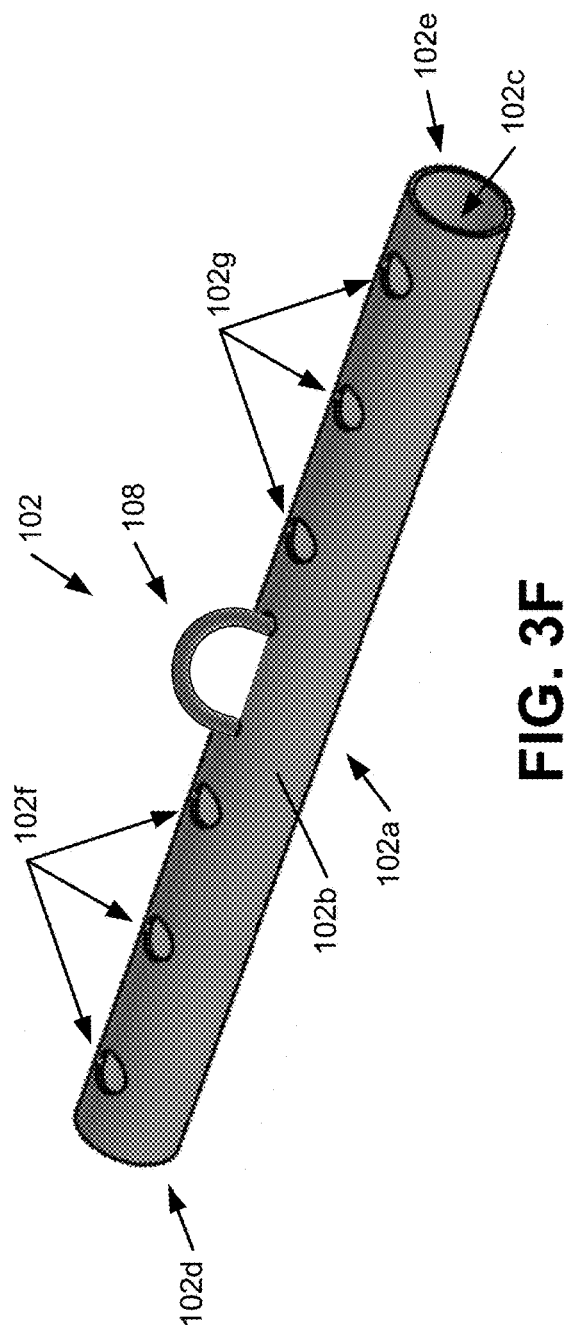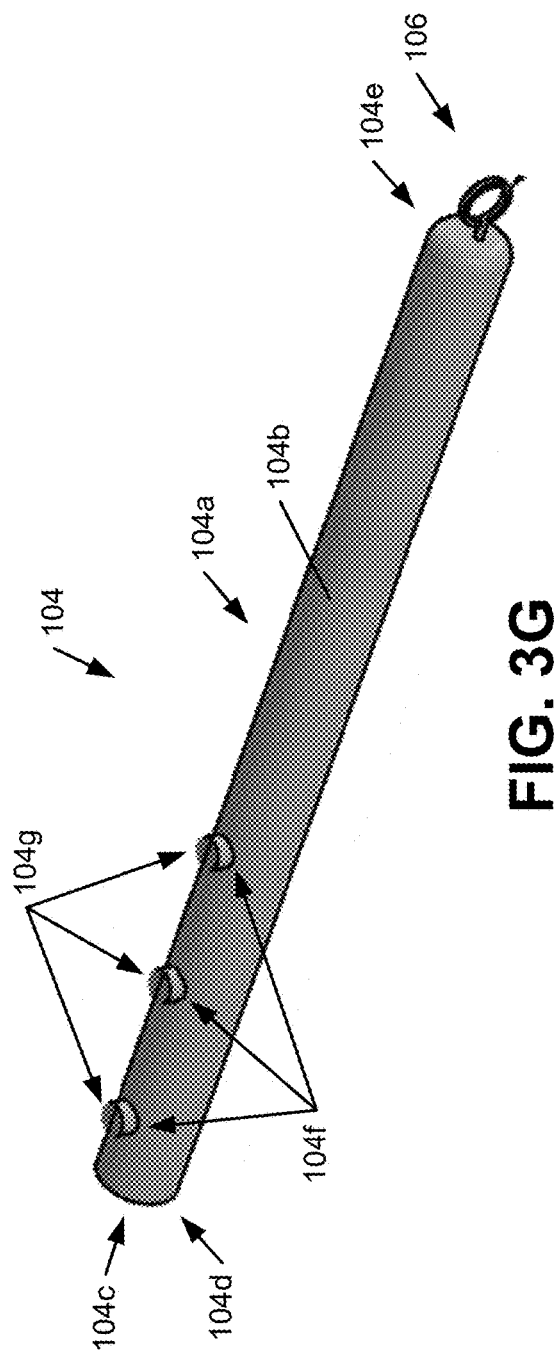
FIG. 3F
FIG. 3G

MULTIPLE DOG ATTACHMENT APPARATUS

CROSS REFERENCE TO RELATED APPLICATION

This application claims the benefit of U.S. Patent Application Ser. No. 62/634,036, which was filed on Feb. 22, 2018, and is incorporated herein by reference in its entirety.

TECHNICAL FIELD

This disclosure relates to implementations of a multiple dog attachment apparatus.

BACKGROUND

FIG. 1 illustrates an example of the existing option for a person to walk multiple dogs. As shown, presently to walk multiple dogs, each dog has to be held by a separate leash. However, the separate leashes often get tangled making the walk difficult and possibly hazardous for both the dog walker and the dogs. Furthermore, the tangled leashes make it difficult to hold onto the multiple dogs while adding or releasing a dog from the group.

BRIEF DESCRIPTION OF THE DRAWINGS

FIG. 3F illustrates a perspective view of a center part of the multiple dog attachment apparatus according to the present disclosure.

FIG. 3G illustrates a perspective view of a side part of the multiple dog attachment apparatus according to the present disclosure.

DETAILED DESCRIPTION

Implementations of a multiple dog attachment apparatus are provided. In some implementations, the multiple dog attachment apparatus comprises a connection apparatus, a first and a second collar connector, and a leash connector.

In some implementations, the multiple dog attachment apparatus is configured to connect multiple dogs together and to a single leash to allow the walking of the multiple dogs using the single leash instead of multiple separate leashes.

In some implementations, the multiple dog attachment apparatus is configured to allow multiple dogs to be walked with a single leash instead of with multiple separate leashes that tangle together and make dog walking difficult and possibly hazardous for the dog walker and/or the dogs being walked.

In some implementations, the multiple dog attachment apparatus is configured to allow the adding or releasing of a dog from a group of multiple dogs held with a single leash through the multiple dog attachment apparatus without the difficulty of holding onto the dogs caused by the tangling of multiple separate leashes.

In some implementations, the multiple dog attachment apparatus is configured to attach one or more additional configurations of an additional multiple dog attachment apparatus and one or more additionally attached dogs to walk additional multiple dogs using the single leash with two or more multiple dog attachment apparatuses.

In some implementations, a method of using the multiple dog attachment apparatus comprises attaching a first dog to the multiple dog attachment apparatus, attaching a second dog to the multiple dog attachment apparatus, and attaching a leash to the multiple dog attachment apparatus.

Figure 3A:
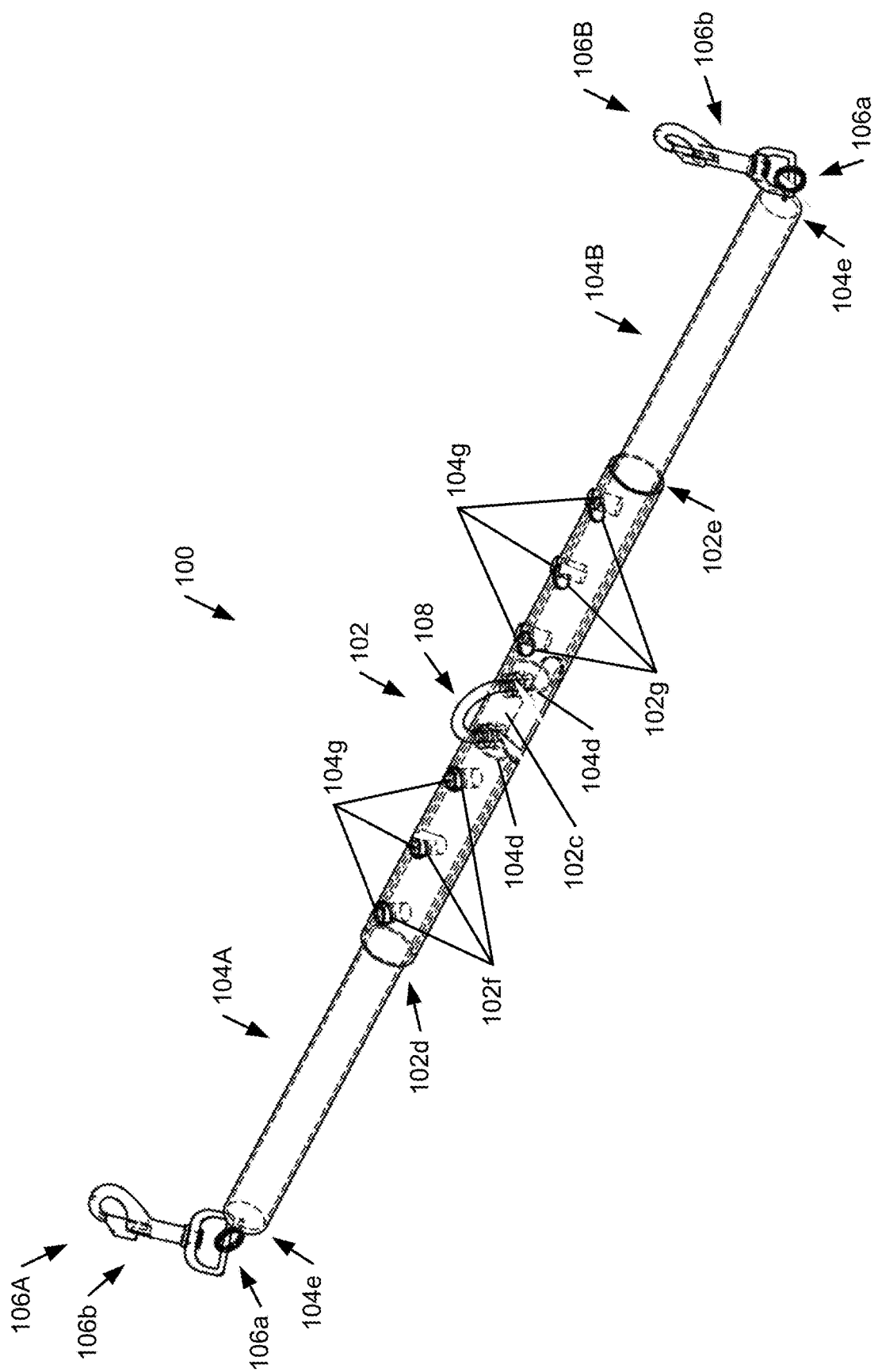
FIG. 3A illustrates a perspective view of an implementation of the multiple dog attachment apparatus according to the present disclosure.
Figure 3B:
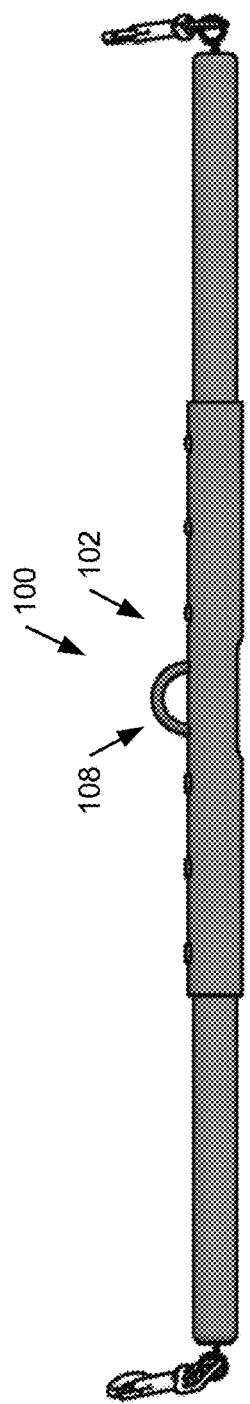
FIG. 3B illustrates a front side or back side view of the multiple dog attachment apparatus according to the present disclosure.
Figure 3C:
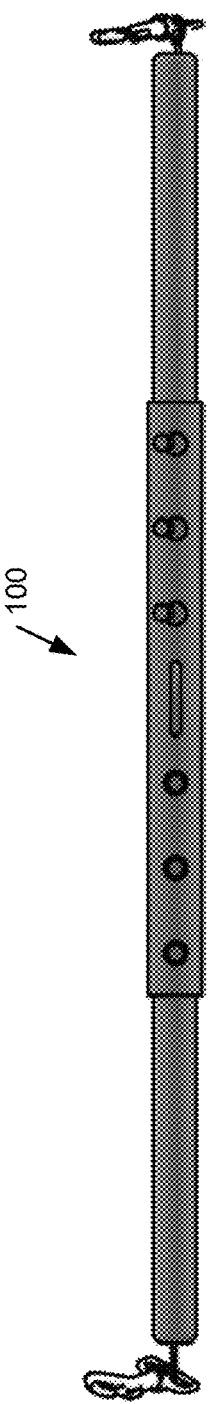
FIG. 3C illustrates a top side view of the multiple dog attachment apparatus according to the present disclosure.

As described above, FIGS. 3A-3G illustrate various views of an implementation of an example multiple dog attachment apparatus 100 according to the present disclosure. As shown in FIG. 3A, in some implementations, the multiple dog attachment apparatus 100 comprises a center part 102, a first and a second side part 104A, 104B (collectively, "side part(s) 104"), a first and a second collar connector 106A, 106B (collectively, "collar connector(s) 106"), and a leash connector 108.

As shown in FIG. 3F, in some implementations, the center part 102 comprises an elongated tube 102a having a cylindrical wall 102b defining an interior 102c and having a first end opening 102d and an opposite, second end opening 102e into the interior 102c.

In some implementations, the center part 102 comprises a first side part attachment opening 102f extending through the wall 102b into the interior 102c adjacent to the first end opening 102d. In some implementations, the center part 102 comprises a second side part attachment opening 102g extending through the wall 102b into the interior 102c adjacent to the second end opening 102e.

In some implementations, the first and second side part attachment openings 102f, 102g extend perpendicular respectively to the adjacent first and second end openings 102d, 102e.

As shown in FIG. 3F, in some implementations, the center part 102 may comprise two or more side part attachment openings 102f, 102g. For example, in some implementations, the center part 102 may comprise an additional side part attachment opening 102f, 102g. In some implementations, the center part 102 may comprise three side part attachment openings 102f, 102g. In some implementations, the center part 102 may comprise more than three side part attachment openings 102f, 102g as suitable to the structure and/or function of the multiple dog attachment apparatus 100 as described herein.

As shown in FIG. 3F, in some implementations, the two or more side part attachment openings 102f, 102g of the center part 102 may be aligned lengthwise along the center part 102.

In some implementations, the two or more side part attachment openings 102f, 102g are configured to allow the adjustment respectively of how far the side parts 104 telescopingly extend from the interior 102c of the center part 102, as further described below. In some implementations, the two or more side part attachment openings 102f, 102g are thereby configured to allow the adjustment of the length of the multiple dog attachment apparatus 100 and/or the length of each side part 104 respectively extending from the center part 102.

As shown in FIG. 3G, in some implementations, the side part 104 comprises an elongated tube 104a having a cylindrical wall 104b defining an interior 104c and having a first end 104d and an opposite, second end 104e.

In some implementations, the side part 104 comprises an attachment button opening 104f extending through the wall 104b into the interior 104c adjacent to the first end 104d.

As shown in FIG. 3G, in some implementations, the first end 104d of the side part 104 may comprise an opening into the interior 104c of the side part 104.

In some implementations, the second end 104e of the side part 104 may be at least partially closed to the interior 104c of the side part 104. For example, in some implementations, the second end 104e may comprise a small opening configured to allow the attachment of the collar connector 106 to the side part 104.

In some implementations, the side part 104 comprises an attachment button 104g moveably extending through the attachment button opening 104f.

In some implementations, the attachment button 104g may comprise a push button tube locking pin. In some implementations, the attachment button 104g may comprise a spring button locking pin. In some implementations, the attachment button 104g may comprise a push button spring clip tube locking pin.

In some implementations, the attachment button 104g may comprise a spring loaded push button connector. In some implementations, the attachment button 104g may comprise a spring loaded depressible pop-up button. In some implementations, the attachment button 104g may comprise any other suitable mechanism that comprises the appropriate structure and/or function of the attachment button as described herein.

In some implementations, the multiple dog attachment apparatus 100 may comprise another suitable attachment mechanism that connects the center part 102 and the side parts 104, as described herein, in addition or alternate to the attachment button 104g of the side parts 104.

In some implementations, the attachment button 104g is configured to depress into the interior 104c through the attachment button opening 104f. In some implementations, the attachment button 104g is configured to remain extended out of the tube 104a through the attachment button opening 104f when the attachment button 104g is not depressed.

As shown in FIG. 3A, in some implementations, the attachment button 104g of the side parts 104 is configured to extend respectively through the first side part attachment opening 102f and the second side part attachment opening 102g of the center part 102. In some implementations, the attachment button 104g is configured to extend when the first end 104d of the side parts 104 are telescopingly inserted respectively into the interior 102c of the center part 102 through the first end opening 102d and the second end opening 102e. In some implementations, the attachment button 104g of the side parts 104 are configured to extend when aligned respectively with the first side part attachment opening 102f and the second side part attachment opening 102g.

In some implementations, the attachment button 104g of the side parts 104 are further configured to thereby respectively secure the side parts 104 to the center part 102 while telescopingly extending respectively from the interior 102c.

In some implementations, the attachment button 104g of the side parts 104 are further configured to extend respectively through the one or more additional side part attachment openings 102f, 102g described above with respect to the center part 102. In some implementations, the attachment button 104g of the side parts 104 are further configured to extend when the side parts 104 are telescopingly inserted and the attachment button 104g is aligned in the same or similar manner as described above for a single attachment opening 102f, 102g. In some implementations, the attachment button 104g of the side parts 104 are further configured to thereby respectively secure the side parts 104 in the same or similar manner as described above for a single attachment opening 102f, 102g.

As shown in FIG. 3G, in some implementations, the side parts 104 may comprise two or more attachment buttons 104g. For example, in some implementations, the side parts 104 may comprise an additional attachment button 104g. In some implementations, the side parts 104 may comprise three attachment buttons 104g. In some implementations, the side parts 104 may comprise more than three attachment buttons 104g as suitable to the structure and/or function of the multiple dog attachment apparatus 100 as described herein.

As shown in FIG. 3G, in some implementations, the two or more attachment buttons 104g of the side part 104 may be aligned lengthwise along the side part 104.

In some implementations, the two or more attachment buttons 104g of the side parts 104 are each configured to extend respectively through the side part attachment opening 102f, 102g described above with respect to the center part 102. In some implementations, the two or more attachment buttons 104g of the side parts 104 are each configured to extend when the side parts 104 are telescopingly inserted and any of the two or more attachment buttons 104g is aligned in the same or similar manner as described above for a single attachment button 104g. In some implementations, the two or more attachment buttons 104g of the side parts 104 are each configured to thereby respectively secure the side parts 104 in the same or similar manner as described above for a single attachment button 104g.

In some implementations, the two or more attachment buttons 104g are configured to allow the adjustment respectively of how far the side parts 104 telescopingly extend from the interior 102c of the center part 102, as further described below. In some implementations, the two or more attachment buttons 104g are thereby configured to allow the adjustment of the length of the multiple dog attachment apparatus 100 and/or the length of each side part 104 respectively extending from the center part 102.

Figure 3D:
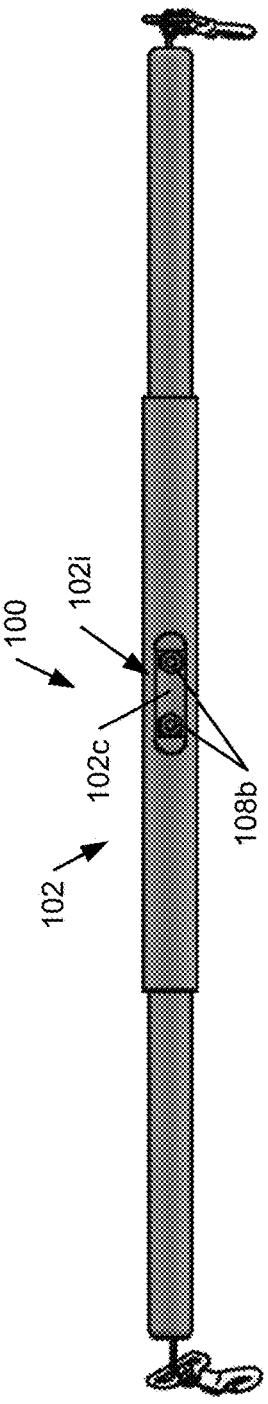
FIG. 3D illustrates a bottom side view of the multiple dog attachment apparatus according to the present disclosure.
Figure 3E:
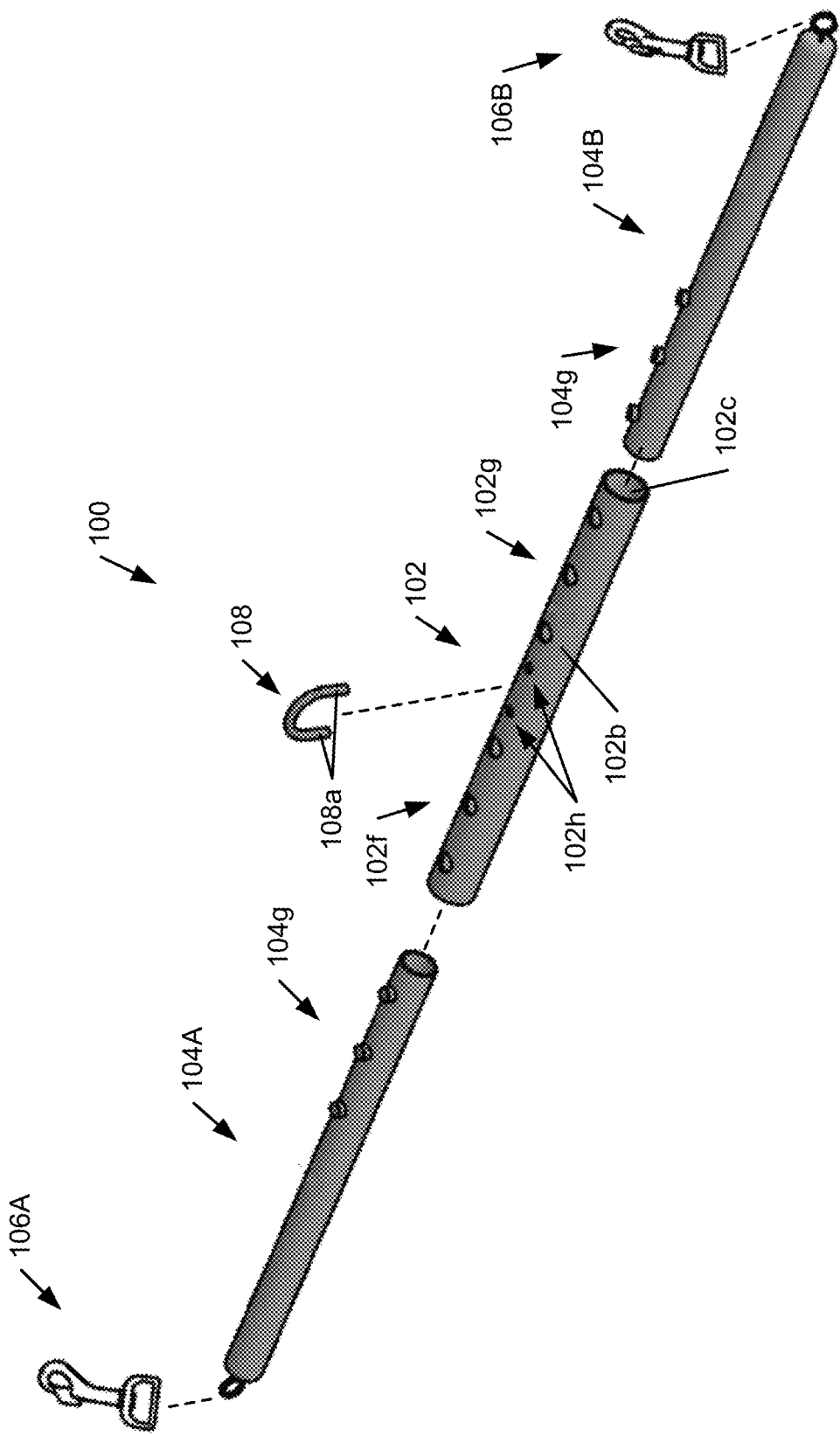
FIG. 3E illustrates an exploded perspective view of the multiple dog attachment apparatus according to the present disclosure.

As shown in FIG. 3E, in some implementations, the center part 102 may comprise two or more side part attachment openings 102f, 102g, and also the side parts 104 may comprise two or more attachment buttons 104g, as described above respectively. In some implementations, for such configurations, the two or more side part attachment openings 102f, 102g and the two or more attachment buttons 104g are structured, configured, and function in the same or similar manner as described herein for each respectively.

As shown in FIG. 3A, in some implementations, the side parts 104 are configured to telescopingly insert from the first end 104d into the interior 102c of the center part 102 respectively through the first end opening 102d and the second end opening 102e of the center part 102.

In some implementations, the center part 102 and the side parts 104 may be configured as an integrated or combined single part. For example, in some implementations, the parts 102, 104 may be configured as a single continuous tube. In some implementations, the parts 102, 104 may be configured as a single adjustable length tube. In some implementations, the parts 102, 104 may be configured in any other suitable integrated or combined configuration.

As shown in FIG. 3A, in some implementations, the first collar connector 106A is attached to the second end 104e of the first side part 104A. In some implementations, the second collar connector 106B is attached to the second end 104e of the second side part 104B.

In some implementations, the collar connectors 106 may be removably attached respectively to the side parts 104.

As shown in FIG. 3A, in some implementations, the collar connectors 106 may each comprise an eyebolt 106a. In some implementations, the collar connectors 106 may each further comprise a swivel eye carabiner or snap hook 106b connected to the eyebolt 106a. In some implementations, the collar connector 106 may comprise any other suitable connector that can connect to a dog collar or harness.

In some implementations, the collar connectors 106 are each configured to connect to a dog collar or harness.

In some implementations, the collar connectors 106 are moveably attached respectively to the side parts 104 in a configuration that allows a swivel motion of the collar connectors 106.

As shown in FIG. 3G, in some implementations, the leash connector 108 is attached to the wall 102b of the center part 102 between the first side part attachment opening 102f and the second side part attachment opening 102g.

In some implementations, the leash connector 108 may be removably attached to the center part 102.

As shown in FIG. 3E, in some implementations, the leash connector 108 may comprise a U-bolt. In some implementations, the leash connector 108 may comprise any other suitable connector that can connect to a dog leash or tether while attached to the center part 102.

As shown in FIG. 3E, in some implementations, the center part 102 may further comprise two or more U-bolt openings 102h extending through the wall 102b into the interior 102c of the center part 102. In some implementations, the U-bolt openings 102h are configured to at least partially receive the legs 108a of the U-bolt 108 through the U-bolt openings 102h.

As shown in FIG. 3E, in some implementations, the U-bolt openings 102h may be aligned lengthwise with the first side and/or second side attachment openings 102f, 102g along the center part 102.

As shown in FIG. 3D, in some implementations, the center part 102 may further comprise a U-bolt attachment access opening 102i extending through the wall 102b into the interior 102c of the center part 102. In some implementations, the U-bolt attachment access opening 102i is positioned opposite to the U-bolt openings 102h.

In some implementations, the U-bolt attachment access opening 102i is configured to allow access into the interior 102c of the center part 102 to attach or remove the U-bolt 108 from the center part 102.

As shown in FIG. 3D, in some implementations, the multiple dog attachment apparatus 100 may further comprise a two or more of locknuts 108b configured to securely attach the U-bolt 108 to the center part 102 from within the interior 102c of the center part 102.

In some implementations, the leash connector 108 is configured to connect to a dog leash or tether.

Figure 1:
FIG. 1 illustrates an example of the existing option for a person to walk multiple dogs using separate leashes.
Figure 2:
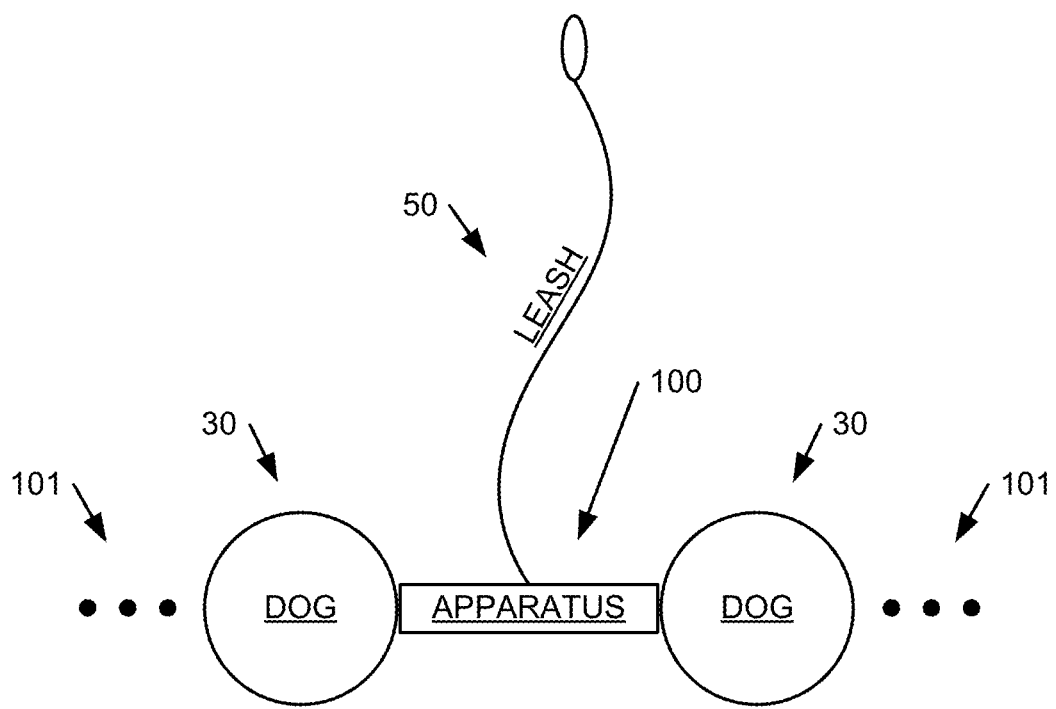
FIG. 2 illustrates a block diagram representation of a multiple dog attachment apparatus connected to multiple dogs and a single leash for walking the multiple dogs according to the present disclosure.

FIG. 2 illustrates a block diagram representation of a multiple dog attachment apparatus 100 connected to multiple dogs 30 and a single leash 50 for walking the multiple dogs 30 according to the present disclosure.

As shown in FIG. 2, in some implementations, the multiple dog attachment apparatus 100 is configured to connect multiple dogs 30 together and to a single leash 50 to allow the walking of the multiple dogs 30 using the single leash 50 instead of multiple separate leashes.

In some implementations, the multiple dog attachment apparatus 100 is configured to allow multiple dogs 30 to be walked with the single leash 50 instead of with multiple separate leashes that tangle together and make dog walking difficult and possibly hazardous for the dog walker and/or the dogs 30 being walked.

In some implementations, the multiple dog attachment apparatus 100 is configured to allow the adding or releasing of a dog 30 from a group of multiple dogs 30 held with a single leash 50 through the multiple dog attachment apparatus 100 without the difficulty of holding onto the dogs 30 caused by the tangling of multiple separate leashes.

As also shown in FIG. 2, in some implementations, the multiple dog attachment apparatus 100 is configured to attach one or more additional configurations 101 of an additional multiple dog attachment apparatus 100 and one or more additionally attached dogs 30 to walk additional multiple dogs 30 using the single leash 50 with two or more multiple dog attachment apparatuses 100.

In some implementations, the multiple dog attachment apparatus 100 comprises any suitable dimensions.

In some implementations, the multiple dog attachment apparatus 100 is composed of any suitable materials.

In some implementations, the multiple dog attachment apparatus 100 can have any suitable appearance.

In some implementations, with respect to the above described elements and features of FIGS. 2 and 3A-3G, an example method of using, e.g. assembling, the multiple dog attachment apparatus 100 comprises depressing the attachment button 104g of the first side part 104A so that the first side part 104A can be telescopingly inserted from the first end 104d into the interior 102c of the center part 102. In some implementations, the method comprises telescopingly inserting the first side part 104A from the first end 104d into the interior 102c of the center part 102 through the first end opening 102d so that the attachment button 104g of the first side part 104A is also inserted into the interior 102c of the center part 102.

In some implementations, the method comprises aligning the attachment button 104g of the first side part 104A with the first side part attachment opening 102f within the interior 102c of the center part 102. In some implementations, the aligning thereby allows the attachment button 104g of the first side part 104A to extend through the first side part attachment opening 102f of the center part 102 thereby securing the first side part 104A to the center part 102.

In some implementations, the method comprises depressing the attachment button 104g of the second side part 104B so that the second side part 104B can be telescopingly inserted from the first end 104d into the interior 102c of the center part 102. In some implementations, the method comprises telescopingly inserting the second side part 104B from the first end 104d into the interior 102c of the center part 102 through the second end opening 102e so that the attachment button 104g of the second side part 104B is also inserted into the interior 102c of the center part 102.

In some implementations, the method comprises aligning the attachment button 104g of the second side part 104B with the second side part attachment opening 102g within the interior 102c of the center part 102. In some implementations, the aligning thereby allows the attachment button 104*g* of the second side part 104B to extend through the second side part attachment opening 102*g* of the center part 102 thereby securing the second side part 104 to the center part 102.

In some implementations, with respect to the above described elements and features of FIGS. 2 and 3A-3G, another example method of using the multiple dog attachment apparatus 100 comprises attaching a first dog 30 to the multiple dog attachment apparatus 100 by connecting a collar or harness that is attached to the first dog 30 to the first collar connector 106A.

In some implementations, the method comprises attaching a second dog 30 to the multiple dog attachment apparatus 100 by connecting a collar or harness that is attached to the second dog 30 to the second collar connector 106B. In some implementations, the method comprises connecting a dog leash 50 to the leash connector 108.

In some implementations, the method further comprises walking the first dog 30 and the second dog 30 attached to the multiple dog attachment apparatus 100 by holding the dog leash 50 attached to the multiple dog attachment apparatus 100.

In some implementations, the method further comprises connecting the first collar connector 106A of an additional multiple dog attachment apparatus 100 to the second collar connector 106B of the multiple dog attachment apparatus 100. In some implementations, the method comprises attaching a third dog 30 to the additional multiple dog attachment apparatus 100 by connecting a collar or harness that is attached to the third dog 30 to the second collar connector 106B of the additional multiple dog attachment apparatus 100.

In some implementations, the first collar connector of the additional multiple dog attachment apparatus may alternately be connected to the first collar connector of the multiple dog attachment apparatus 100.

In some implementations, the first collar connector of the additional multiple dog attachment apparatus may alternately be connected to the collar or harness of the first dog or second dog In some implementations, the method further comprises walking the first dog 30 and the second dog 30 attached to the multiple dog attachment apparatus 100 and the third dog 30 attached to the additional multiple dog attachment apparatus 100 by holding the dog leash 50 attached to the multiple dog attachment apparatus 100.

In some implementations, the method further comprises detaching one of the dogs 30 by disconnecting the respective collar connector 106 of the respective multiple dog attachment apparatus 100.

In some implementations, with respect to the above described elements and features of FIGS. 2 and 3A-3G, another example method of using the multiple dog attachment apparatus 100 comprises depressing the attachment button 104*g* of the first side part 104A so that the first side part 104A can be telescopingly moved within the interior 102*c* of the center part 102.

In some implementations, the method comprises aligning the attachment button 104*g* of the first side part 104A with an additional first side part attachment opening 102*f* within the interior 102*c* of the center part 102. In some implementations, the aligning thereby allows the attachment button 104*g* of the first side part 104A to extend through the additional first side part attachment opening 102*f* of the center part 102 thereby securing the first side part 104A to the center part 102 and adjusting how far the first side part 104A telescopingly extends from the interior 102*c* of the center part 102.

In some implementations, the method comprises depressing the attachment button 104*g* of the second side part 104B so that the second side part 104B can be telescopingly moved within the interior 102*c* of the center part 102.

In some implementations, the method comprises aligning the attachment button 104*g* of the second side part 104B with an additional second side part attachment opening 102*g* within the interior 102*c* of the center part 102. In some implementations, the aligning thereby allows the attachment button 104*g* of the second side part 104B to extend through the additional second side part attachment opening 102*g* of the center part 102 thereby securing the second side part 104B to the center part 102 and adjusting how far the second side part 104B telescopingly extends from the interior 102*c* of the center part 102.

In some implementations, with respect to the above described elements and features of FIGS. 2 and 3A-3G, another example method of using the multiple dog attachment apparatus 100 comprises depressing the attachment button 104*g* and an additional attachment button 104*g* of the first side part 104A so that the first side part 104A can be telescopingly moved within the interior 102*c* of the center part 102.

In some implementations, the method comprises aligning the additional attachment button 104*g* of the first side part 104A with the first side part attachment opening 102*f* within the interior 102*c* of the center part 102. In some implementations, the aligning thereby allows the additional attachment button 104*g* of the first side part 104A to extend through the first side part attachment opening 104*f* of the center part thereby securing the first side part 104A to the center part and adjusting how far the first side part 104A telescopingly extends from the interior 102*c* of the center part 102.

In some implementations, the method comprises depressing the attachment button 104*g* and the additional attachment button 104*g* of the second side part 104B so that the second side part 104B can be telescopingly moved within the interior 102*c* of the center part 102.

In some implementations, the method comprises aligning the additional attachment button 104*g* of the second side part 104B with the second side part attachment opening 102*g* within the interior 102*c* of the center part 102. In some implementations, the aligning thereby allows the additional attachment button 104*g* of the second side part 104B to extend through the second side part attachment opening 102*g* of the center part 102 thereby securing the second side part 104B to the center part 102 and adjusting how far the second side part 104B telescopingly extends from the interior 102*c* of the center part 102.

The figures, including photographs and drawings, comprised herewith may represent one or more implementations of the multiple dog attachment apparatus.

Details shown in the figures, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

The invention claimed is:

1. A multiple dog attachment apparatus, comprising:
   a connection apparatus comprising an elongated member having a first end and an opposite second end;
   a first collar connector extending from the first end of the connection apparatus and configured to connect to a first dog collar without the use of a leash;
   a second collar connector extending from the second end of the connection apparatus and configured to connect to a second dog collar without the use of a leash; and
   a leash connector extending from the connection apparatus between the first end and the second end and comprising a connector configured to be connected to a dog leash.

2. The multiple dog attachment apparatus of claim 1, wherein the connection apparatus is further configured to be rigid and to be adjustable in length between the first end and the second end.

3. A method of using the dog attachment apparatus of claim 1, comprising:
   connecting the first dog collar to the first collar without the use of a leash;
   connecting the second dog collar to the second collar connector without the use of a leash; and
   connecting a flexible dog leash to the leash connector.

4. A multiple dog attachment apparatus, comprising:
   a connection apparatus comprising an elongated member having a first end and an opposite second end;
   a first collar connector extending from the first end of the connection apparatus and configured to connect to a first dog collar;
   a second collar connector extending from the second end of the connection apparatus and configured to connect to a second dog collar; and
   a leash connector extending from the connection apparatus between the first end and the second end and comprising a connector configured to be connected to a dog leash wherein the first collar connector and the second collar connector each comprise a snap hook connector; and
   the leash connector comprises a ring.

5. A multiple dog attachment apparatus, comprising a center part, a first side part, a second side part, a first collar connector, a second collar connector, and a leash connector, wherein:
   the center part comprises:
      an elongated tube having a cylindrical wall defining an interior and having a first end opening and an opposite, second end opening into the interior;
      a first side part attachment opening extending through the wall into the interior adjacent to the first end opening; and
      a second side part attachment opening extending through the wall into the interior adjacent to the second end opening;
   the first side part and the second side part each comprise:
      an elongated tube having a cylindrical wall defining an interior and having a first end and an opposite, second end;
      an attachment button opening extending through the wall into the interior adjacent to the first end; and
      an attachment button moveably extending through the attachment button opening, wherein the attachment button is configured to depress into the interior through the attachment button opening and the attachment button is configured to remain extended out of the tube through the attachment button opening when the attachment button is not depressed;
   the first side part and the second side part are configured to telescopingly insert from the first end into the interior of the center part respectively through the first end opening and the second end opening of the center part;
   the attachment button of the first side part and the second side part are configured to extend respectively through the first side part attachment opening and the second side part attachment opening of the center part when the first end of the first side part and of the second side part are telescopingly inserted respectively into the interior of the center part through the first end opening and the second end opening of the center part to align the attachment button of the first side part and the second side part respectively with the first side part attachment opening and the second side part attachment opening, and the attachment button of the first side part and the second side part are further configured to thereby respectively secure the first side part and the second side part to the center part telescopingly extending respectively from the interior of the center part;
   the first collar connector is attached to the second end of the first side part, and the second collar connector is attached to the second end of the second side part;
   the first collar connector and the second collar connector are each configured to connect to a dog collar or harness; and
   the leash connector is attached to the wall of the center part between the first side part attachment opening and the second side part attachment opening and is configured to connect to a dog leash.

6. The multiple dog attachment apparatus of claim 5, wherein:
   the first side part telescopingly extends from the interior of the center part through the first end opening with the first end of the first side part inserted in the interior of the center part, and the attachment button of the first side part extends through the first side part attachment opening of the center part and thereby secures the first side part to the center part; and
   the second side part telescopingly extends from the interior of the center part through the second end opening with the first end of the second side part inserted in the interior of the center part, and the attachment button of the second side part extends through the second side part attachment opening of the center part and thereby secures the second side part to the center part.

7. A method of using the multiple dog attachment apparatus of claim 6, comprising:
attaching a first dog to the multiple dog attachment apparatus by connecting a collar or harness that is attached to the first dog to the first collar connector;
attaching a second dog to the multiple dog attachment apparatus by connecting a collar or harness that is attached to the second dog to the second collar connector; and
connecting a dog leash to the leash connector.

8. The method of claim 7, further comprising walking the first dog and the second dog attached to the multiple dog attachment apparatus by holding the dog leash attached to the multiple dog attachment apparatus.

9. The method of claim 7, further comprising:
connecting the first collar connector of an additional multiple dog attachment apparatus to the second collar connector of the multiple dog attachment apparatus; and
attaching a third dog to the additional multiple dog attachment apparatus by connecting a collar or harness that is attached to the third dog to the second collar connector of the additional multiple dog attachment apparatus.

10. The multiple dog attachment apparatus of claim 5, wherein the first collar connector and the second collar connector each comprise an eyebolt.

11. The multiple dog attachment apparatus of claim 10, wherein the first collar connector and the second collar connector each further comprise a swivel eye carabiner connected to the eyebolt.

12. The multiple dog attachment apparatus of claim 5, wherein the first collar connector and the second collar connector are moveably attached respectively to the first side part and the second side part in a configuration that allows a swivel motion of the first collar connector and the second collar connector.

13. The multiple dog attachment apparatus of claim 5, wherein the first collar connector and the second collar connector are removably attached respectively to the first side part and the second side part.

14. The multiple dog attachment apparatus of claim 5, wherein the leash connector comprises a U-bolt.

15. The multiple dog attachment apparatus of claim 14, further comprising:
a pair of U-bolt openings extending through the wall into the interior of the center part and configured to partially receive the legs of the U-bolt therethrough;
a U-bolt attachment access opening extending through the wall into the interior of the center part opposite the U-bolt openings and configured to allow access into the interior of the center part to attach or remove the U-bolt from the center part; and
a pair of locknuts configured to securely attach the U-bolt to the center part from within the interior of the center part.

16. The multiple dog attachment apparatus of claim 5, wherein the leash connector is removably attached to the center part.

17. The multiple dog attachment apparatus of claim 5, wherein the attachment button comprises a push button tube locking pin.

18. The multiple dog attachment apparatus of claim 5, wherein the center part further comprises:

an additional first side part attachment opening extending through the wall into the interior adjacent to the first side part attachment opening along the length of the center part; and
an additional second side part attachment opening extending through the wall into the interior adjacent to the second side part attachment opening along the length of the center part;
wherein:
the attachment button of the first side part and the second side part are further configured to extend respectively through the additional first side part attachment opening and the additional second side part attachment opening of the center part when the first end of the first side part and of the second side part are telescopingly inserted respectively into the interior of the center part through the first end opening and the second end opening of the center part to align the attachment button of the first side part and the second side part respectively with the additional first side part attachment opening and the additional second side part attachment opening, and the attachment button of the first side part and the second side part are further configured to thereby respectively secure the first side part and the second side part to the center part telescopingly extending respectively from the interior of the center part; and
the additional first side part attachment opening and the additional second side part attachment opening are configured to allow the adjustment respectively of how far the first side part and the second side part telescopingly extends from the interior of the center part.

19. The multiple dog attachment apparatus of claim 5, wherein the first side part and the second side part each further comprise:
an additional attachment button opening extending through the wall into the interior adjacent to the attachment button opening along the length of the first side part and the second side part respectively; and
an additional attachment button moveably extending through the additional attachment button opening, wherein the additional attachment button is configured to depress into the interior through the additional attachment button opening and the additional attachment button is configured to remain extended out of the tube through the additional attachment button opening when the additional attachment button is not depressed;
wherein:
the additional attachment button of the first side part and the second side part are configured to extend respectively through the first side part attachment opening and the second side part attachment opening of the center part when the first end of the first side part and of the second side part are telescopingly inserted respectively into the interior of the center part through the first end opening and the second end opening of the center part to align the additional attachment button of the first side part and the second side part respectively with the first side part attachment opening and the second side part attachment opening, and the additional attachment button of the first side part and the second side part are further configured to thereby respectively secure the first side part and the second side part to the center part telescopingly extending respectively from the interior of the center part; and the additional attachment button of the first side part and the second side part are configured to allow the adjustment respectively of how far the first side part and the second side part telescopingly extends from the interior of the center part.

20. A method of using the multiple dog attachment apparatus of claim 5, comprising:

depressing the attachment button of the first side part so that the first side part can be telescopingly inserted from the first end into the interior of the center part;

telescopingly inserting the first side part from the first end into the interior of the center part through the first end opening so that the attachment button of the first side part is also inserted into the interior of the center part;

aligning the attachment button of the first side part with the first side part attachment opening within the interior of the center part and thereby allowing the attachment button of the first side part to extend through the first side part attachment opening of the center part thereby securing the first side part to the center part;

depressing the attachment button of the second side part so that the second side part can be telescopingly inserted from the first end into the interior of the center part;

telescopingly inserting the second side part from the first end into the interior of the center part through the second end opening so that the attachment button of the second side part is also inserted into the interior of the center part; and aligning the attachment button of the second side part with the second side part attachment opening within the interior of the center part and thereby allowing the attachment button of the second side part to extend through the second side part attachment opening of the center part thereby securing the second side part to the center part.

* * * * *